United States Patent [19]

Kurahashi

[11] Patent Number: 4,576,854

[45] Date of Patent: Mar. 18, 1986

[54] PACKAGING TAPE

[75] Inventor: Yoshio Kurahashi, Tokyo, Japan

[73] Assignee: Nippon Optical Fiber Co., Ltd., Tokyo, Japan

[21] Appl. No.: 630,531

[22] Filed: Jul. 13, 1984

[30] Foreign Application Priority Data

Jul. 21, 1983 [JP] Japan .................................. 58-133929
Feb. 8, 1984 [JP] Japan .................................. 59-20024

[51] Int. Cl.$^4$ .............................................. C09J 7/02
[52] U.S. Cl. ..................................... 428/204; 428/343; 428/352; 428/354; 428/356; 428/906
[58] Field of Search ................ 428/343, 352, 356, 354, 428/204, 906

[56] References Cited

U.S. PATENT DOCUMENTS

| 2,927,868 | 3/1960 | Revoir | 428/356 |
| 3,027,337 | 3/1962 | Tritsch | 428/356 |
| 3,132,041 | 5/1964 | Pihl | 428/356 |
| 3,380,938 | 4/1968 | Mistley et al. | 428/356 |
| 3,697,315 | 10/1972 | Keiji | 428/356 |
| 4,424,244 | 1/1984 | Puskadi | 428/906 |

Primary Examiner—Edith Buffalow
Attorney, Agent, or Firm—Cushman, Darby & Cushman

[57] ABSTRACT

A packaging tape for use in packaging or bundling comprises a tape-like substrate and a self-adhesive layer prepared from an aqueous mixture and coated to dry on at least one surface of the tape-like substrate, wherein the aqueous mixture contains water soluble adhesive as an anchoring ingredient to the tape-like substrate and rubber latex as a self-adhesive ingredient which are mixed with each other by the weight ratio of the water-soluble adhesive to the rubber latex. The packaging tape can provide a sufficient tightening effect on articles to be sealed, bundled, etc. as comparable with that of ordinary adhesive tapes and can be released from the articles quite smoothly without damaging or contaminating the surface thereof.

12 Claims, 3 Drawing Figures

PACKAGING TAPE

BACKGROUND OF THE INVENTION

1. Field of the Invention

This invention concerns a packaging tape and, more specifically, it relates to a packaging tape having a self-adhesive layer at least on one surface thereof for use in sealing, bundling of packaging articles.

2. Description of the Prior Art

Sealing or bundling of articles has often been carried out using plastic films or tapes, for instance, made of polyethylene and polyvinyl chloride, or fiberous or paper-made strings by winding them tightly around the articles and then securing or binding the final end of them. Since the tightening effect for an article is exclusively obtained by the frictional contact between the surface of the article and the films or the strings, for obtaining reliable packaging or bundling with no slacks, it requires somewhat complicated and skilled labours of continuously applying a uniform tension to the film or string during the winding work and then fastening the winding end by means of tape seizing or string not under the tension.

Use of so-called pressure-sensitive adhesive tapes for such applications can significantly save the labours due to the strong adhesive performance of the adhesive tapes to the surface of the articles.

However, intense bond strength of the adhesive tapes to the adherents are not always desirable depending on the kinds of articles and the purpose of the packaging or bundling. For instance, in a case where paper documents, corrugated boxes or the likes are temporarily bundled or sealed with the adhesive tapes, it is not easy to release the tapes from the surface of the articles once after they have been firmly sticked thereto. Further, if the tapes are released forcively, indications such as printed characters or pictures applied on the surface of the articles or even a part of the article surface per se may sometimes be peeled off being sticked to the tapes. Furthermore, dusts or the like are liable to be adsorbed to the residual adhesives transferred from the tapes and remained on the surface of the articles after the release of the tapes, to contaminate the surface and impair the appearance of the articles. The above drawbacks can be overcome to some extent by modifying the composition of the adhesive layer so as to weaken the bond strength of the tape. However, this sacrifices the desired adhesion performance of the tape and, accordingly, can not be used in general packaging applications.

OBJECT OF THE INVENTION

Accordingly, it is an object of this invention to provide a packaging tape for use in sealing, bundling or packaging articles that can maintain an intense and close tightening effect to the articles as comparable with that of the conventional pressure-sensitive adhesive tapes and yet can be removed with ease upon unpacking the articles without damaging or contaminating the surface of them just in the same manner as in the traditional packaging or bundling by the use of the non-adhesive films or strings.

SUMMARY OF THE INVENTION

The present inventors have occasionally found that aqueous mixtures comprising rubber latex and water soluble adhesive coated and dried in the film form some time show peculiar and unexpected behaviors in that they exhibit sufficient pressure-sensitive adhesion only between each other but do not stick to other materials. Then, being triggered by the above finding, we have further made earnest study and experiment for utilizing this novel and unique feature for the development of practically usable adhesive tapes capable of satisfying the above-mentioned object. As the result, we have found that it is essential for the aqueous mixture coated on the surface of the tape that it can satisfy the following conditions (a)–(c) in a well-balanced manner in order to attain the foregoing object: (a) the adhesive layer prepared from the aqueous mixture shows a sufficient bond strength between them against the horizontal peeling (horizontal peeling resistance), while (b) it shows 90° peeling resistance, much lower than the horizontal peeling resistance and, preferably, (c) it shows no adhesion to other materials (such a unique manner of adhesion and an adhesive layer showing such behaviors are herein referred to as self-adhesion and a self-adhesive layer, respectively).

It has further been found that the most important factor to satisfy the above conditions lies in the weight ratio between the water soluble adhesive and the rubber latex combined in the aqueous mixture.

These and other objects of the invention may be attained by a packaging tape for use in packaging or bundling. The tape is unique in that sticks to itself but not to the packaged or bundled article. The packaging tape includes a tape-like substrate having two surfaces with a self-adhesive layer formed on both of the surfaces of the substrate. The self-adhesive layer is prepared from an aqueous mixture of a water soluble adhesive as an anchoring ingredient to the tape-like substrate, and a rubber latex as a self-adhesive ingredient. These ingredients are mixed with each other in a weight ratio of water-soluble adhesive to rubber latex within the range between 0.48 and 1.80. The self-adhesive layers firmly bond to each other at an overlapped area between mated layers when the tape is wound around an article to be packaged or bundled, thereby preventing the mated tape layers from unwinding and separating from each other. Being non-tacky to the surface of the article in contact with the self-adhesive layers the tape can be freely removed from the surface of the article packaged or bundled upon unwinding.

Tape Constitution

The rubber latex as one of the essential ingredients of the packaging tape in this invention serves to provide the coated layers on the tape with such an adequate self-adhesiveness that they can be bonded only between each other but do not stick to other materials. The water soluble adhesive as the other essential ingredient serves to anchor the self-adhesive layers firmly to the surface of the tape substrate, as well as properly control the adhesion strength of the co-existent rubber latex.

Referring to the mixing ratio of the water soluble adhesive to the rubber latex in the aqueous mixture, as the content of the water soluble adhesive is increased, the self-adhesiveness of the coating layer is lowered due to the relative decrease of the latex content and, on the contrary, as the content of the water soluble adhesive is decreased, the anchoring effect of the self-adhesive layer to the tape substrate is lowered.

Accordingly, it is most important in this invention to determine the mixing ratio (by weight) of the water soluble adhesive to the rubber latex in the aqueous mixture within a predetermined range.

The above mixing ratio has been determined experimentally considering that the self-adhesive layers, when bonded to each other, show a sufficient horizontal peeling resistance of about 1.0–6.0 kg/cm and much less 90° peeling resistance of about 200–400 g/cm e.g., for the tape specimens of 18 mm width overlapped for 10 mm length with each other, as well as show no adhesion to other materials. Specifically, the preferred weight ratio between the water soluble adhesive and the rubber latex is selected within a range between 0.48–1.80 (water soluble adhesive/rubber latex).

If the weight ratio is less than 0.48, the anchoring effect of the adhesive layer to the tape surface is lowered to cause undesired peeling of the layer from the tape surface.

If the weight ratio is in excess of 1.80, the bond strength, particularly, a sufficient horizontal peeling resistance to enable the tape for actual packaging or like other uses can no longer be obtained between the self-adhesive layers due to the relative decrease in the content of the rubber latex.

The rubber latex usable in the packaging tape according to this invention can be selected from natural rubber latex and synthetic rubber latex such as polyisoprene rubber having similar properties to those of the natural rubber latex.

The water soluble adhesive usable in the packaging tape according to this invention can include usual water soluble adhesives so long as they have satisfactory anchoring effect to the surface of the tape substrate, for example, those emulsion adhesives selected from the group consisting of acrylate, vinyl acetate, ethylene-vinyl acetate copolymer or the mixture thereof.

The aqueous mixture containing the water soluble adhesive and the rubber latex mixed uniformly with each other by the weight ratio within the above-mentioned range is coated at least on one surface of the tape substrate by using well-known means such as a coating roll, spray or dipping and then dried to form a self-adhesive layer.

The thickness of the adhesive layer is usually within a range of about 3–10μ and, preferably, 5–7μ as the dry state. If the layer thickness is less than 3μ, it is difficult to form the satisfactory self-adhesive layer uniformly on the tape substrate. While on the other hand, if the layer thickness is increased to more than 10μ, the adhesion strength can not be improved by so much.

The tape-like substrate usable in this invention may be prepared from known tape materials. Preferred tape materials include plastic films such as of polypropyrene, polyethylene, polyester and polyvinyl chloride. Polypropylene films, among all, biaxially oriented polypropylene film (OPP) are particularly suited since it can provide a satisfactory tightening effect to the articles to be packaged or sealed.

In the use of the polypropylene film for the tape substrate, it is preferred to provide a primer or underlying coat, for instance made of polyvinyl chloride on the surface of the substrate for improving the anchoring effect of the self-adhesive layers to the substrate. Further, plasma or corona discharge treatment is desirably applied to the surface of the polypropyrene substrate previously in the case where ink layers are additionally coated on the tape substrate in one modified embodiment of this invention as will be described later.

Use of a moisture proof cellophane tape applied with moisture-proofing treatment on the surface thereof, for example, using polyvinyl chloride or the like is also preferred, because such a moisture-proof layer itself forms a primer or under coat to improve the anchoring effect of the self-adhesive layer to the surface of the tape substrate, as well as it can provide an excellent air tight and moisture-proof sealing that is sometimes required in the packaging use.

In this case, a wetting agent is further incorporated into the aqueous mixture comprising the water soluble adhesive and the rubber latex in order to improve its coating performance, that is, so-called "wetting" to the surface of the tape substrate. The wetting agent usable herein can include most commercially available wetting agents including sulfosuccinic acid esters, alkylnaphthalene sulfonates or the like.

The content of the wetting agent in the aqueous mixture is within a range of 1.3–2.2% by weight as the solid content. If the content of the wetting agent is less than 1.3% by weight, no desired "wetting" can be obtained. While on the other hand, if the content is more than 2.2% by weight, an excess "sagging" resulted upon coating of the aqueous mixture making it difficult to form the uniform self-adhesive layer.

Anti-blocking Treatment

In the case where the self-adhesive layers are coated on both surfaces of the tape and then wound around a paper core into a final shape of product, undesirable blocking may sometime occur between the adjacent self-adhesive layers due to aging degradation. Accordingly, it is preferred to apply an appropriate anti-blocking treatment on the surface of the self-adhesive layers so as to facilitate the release of the tape and prevent the peeling of the adhesive layer from the underlying tape substrate.

The anti-blocking agent usable in this treatment may optionally be selected from so-called releasing agents that are used for treating the back surface of the conventional adhesive tapes and they, preferably, include inorganic silicon compounds such as highly pure SiO fine power, and organic silicon compounds such as polymethylsiloxane or the like. Corn starches of an adequate grain size (about 10–25μ) may also be used as the anti-blocking agent.

In applying the anti-blocking treatment, the tape having the self-adhesive layer coated at least on one surface thereof may be passed, for example, through an aqueous solution containing finely powdered silica of about 1.5–5% and, preferably, about 3% by weight for depositing to dry the silicon powder thereon.

Heat Treatment

While the packaging tape according to this invention prepared by coating and drying the aqueous mixture on the tape substrate to form the self-adhesive layer may be used as it is as the final product, it is desirable to apply heat treatment to the thus prepared tape. For instance, the self-adhesion of the tape can be improved by heating to dry the tape at a temperature of about 40°–50° C. for about 10–20 hours.

Use of the Tape

The most important and unique feature of the packaging tape according to this invention as described above resides in the mode, for instance, of packaging or sealing articles by using the tape.

In the case of the conventional adhesive tapes, an article is generally packaged or sealed by winding a tape around the article while tightly bonding the adhesive layer formed on one surface of the tape to the surface of the article to be packaged or sealed.

On the contrary, in the use of the packaging tape according to this invention, the self-adhesive layers coated on the surface of the tape substrate do not stick to the surface of the article. For instance, a tape having the self-adhesive layers coated on both surfaces thereof is merely wound around the surface of the article in a lap winding manner, in which the adhesive layers on the surface and the rear face of the adjacent turns of the tape are put to intimate self-adhesion with each other at the overlapped area when the tape is wound around tightly over the article, to provide an intense tightening effect for the article.

Since the bond strength between the thus bonded self-adhesion layers is as large as 1.0–6.0 kg/cm (for 18 mm tape width) against horizontal peeling, the packaging thus completed to the article can be kept as it is with no slacks over a long period of time just in the same manner as in the conventional adhesive tapes. Thus, different from the ordinary adhesive tapes, the tightening effect for the article is obtained in this invention not by the bond strength between the tape and the substrate of the article but by the tension applied to the tape upon winding, and the tightening effect can be kept as it is with no slacks by the bond strength between the overlapped self-adhesive layers.

Then, upon unpacking the article, the packaging tape is released from the winding end thereof in the direction opposite to that in the initial winding. Since the self-adhesive layers show much less resistance against 90° peeling which is as low as about 1/10 or less of the horizontal peeling, they can be detached easily from each other. Particularly, since the self-adhesive layers do not adhere to the surface of the article, it can be removed quite smoothly from the surface of the article. This is just the point that the packaging tape according to this invention can be distinguished from and superior to ordinary adhesive tapes. Because of such unique features in the mode of use, the packaging tape according to this invention can be used suitably and conveniently for the sealing of the corrugated cases, as well as for the temporal bundling of paper products such as documents or textile products, etc.

In the case of bundling paper documents, for instance, the users have only to wind the packaging tape on the surface of the documents to be bundled in a lap winding manner with such an extent of tightening force that can firmly gather the documents together, whereby the adjacent self-adhesive layers of the packaging tape are put to pressure-sensitive adhesion to each other at the overlapped portion and the documents can be bundled rapidly and easily. Since the bond strength of about 1–6 kg/cm (for 18 mm tape width) can be obtained against the horizontal peeling between the bonded self-adhesive layers, a tightly bundled state can surely be maintained with no slacks.

Upon disintegrating the bundled documents, the tape is released from its winding end in the direction opposite to that in the initial winding. Since the self-adhesive layers bonded together show much less 90° peeling resistance as low as 200–400 g/cm (for 18 mm tape width), the upper adhesive layer can easily be detached from the underlying adhesive layer smoothly. Particularly, since the adhesive layer in contact with the surface of the documents does not adhere thereto, different from the case of using the ordinary adhesive tapes, it can be removed quite smoothly while resulting in no damages to the surface of the document itself or the printed indications thereon.

Furthermore, since the tape can be removed without leaving a portion of the adhesive layer on the surface of the documents after peeling as in the case of the ordinary adhesive tapes, deposition of dusts or the like on the surface of the documents can be avoided.

In the packaging tape according to this invention, the self-adhesive layer may be coated only on one surface of the tape substrate and such a tape can be used in a convenient manner, for instance, for packaging minute sheet-like articles, as well as powderous or granular materials. In the case of packaging granular materials, for instance, seeds of a plant, the packaging tape is folded back with the surface having the self-adhesive layer being opposed to each other, while putting the seeds therebetween. Then, the mating peripheral edges of the folded tape are bonded to each other to complete a tightly sealed seed pack. Upon depacking, the seeds can be taken out with no sticking to the inside, i.e., self-adhesive layer of the tape. In the same manner, photocopies or like other sheet materials can also be packaged in an airtight sealing and they can be taken out with no damages on the surface.

Color Tape

In a modified practical embodiment of the packaging tape according to this invention, an ink colored layer is preferably incorporated between the tape substrate and the self-adhesive layer in a case where printed color is desired for the tape with an aim of indication or aesthetic appearance.

In this case, the ink colored layer may be disposed only on one surface or on both surfaces of the tape substrate and the self-adhesive layer is coated thereover. The ink colored layer comprises a printing ink composition generally containing a vehicle, a pigment and auxiliary agents such as disperser, deformer, plasticizer or the like.

The vehicle is preferably selected from those having an excellent adherent property both to the tape substrate and the self-adhesive layer, as well as a high ink film-forming performance and they include, for instance, nitrocellulose, ethylcellulose, polyamide resin, vinyl chloride-vinyl acetate copolymer resin, acrylic resin, polyvinyl butyral, polyurethane and polyester.

The use of so-called two-pack reaction type gravure printing inks or screen printing inks is recommended. Particularly preferred are polyurethane type gravure inks in which an inking component comprising those materials having functional groups, for example, vinyl chloride-vinyl acetate copolymer, polyester polyol or polyether polyol is brought into reaction with a curing component comprising isocyanate prepolymer after the printing. Epoxy or melamine type inks can also be used.

It has been found by the present inventor that the self-adhesive layer in the packaging tape according to this invention can firmly be secured directly to the underlying ink colored layer with no requirement of providing additional under coating as required in the ordinary color adhesive tapes. Since the two-pack reaction type ink, particularly, polyurethane ink can be firmly secured to the substrate upon curing reaction as is well-known, the adhesive layer is firmly anchored to the tape substrate with no need of additional provision of an anchor coat.

The tape substrate for use in this color tape may be selected from various materials as already described. However, printing performance has to be taken into consideration in this case. For example, in the case where ordinary polyethylene or polypropylene (biaxially oriented or non-oriented) is used as the tape substrate, it is preferred to improve the adhesion of the printing ink to the tape substrate by previously applying the surface treatment to the substrate using, e.g., gas flame or corona discharge or by coating a polyvinylidene chloride resin or the like.

PREPARATION OF PACKAGING TAPE

Explanation will be made more specifically referring to the preparation examples of the packaging tapes according to this invention, as well as the physical properties thereof.

PREPARATION EXAMPLE A-1

41.3 parts by weight of an aqueous copolymer resin emulsion mainly comprising methylmethacrylate and butylacrylate as the water soluble adhesive ingredient (46% solid concentration) (Mowinyl DM 772, trade mark of Hoechst AG), 20.6 parts by weight of water and 1.7 parts by weight of an aqueous 28% ammonia solution were mixed, to which 33 parts by weight of natural rubber latex (60% solid concentration) as the rubber latex ingredient and 3.3 parts by weight of wetting agent mainly composed of sulfosuccinic acid ester (44% solid concentration) (Nopcowet-50, trade mark of Sun Nopco Co.) were further mixed to prepare an aqueous mixture for forming the self-adhesive layer (aqueous mixture No. A-1) (adhesive/latex weight ratio: about 0.95/1).

The aqueous mixture (No. A-1) was uniformly coated on both surfaces of a moisture-proof cellophane tape (MST #400, manufactured by Toyo Cellophane Co., Ltd.) with 20μ thickness and 18 mm width having a moisture-proof layer made of polyvinyl chloride coated on both surfaces thereof and dried to prepare a self-adhesive layer of about 6μ thickness, while transferring the tape at a predetermined velocity.

Then, the coated tape was immersed into an aqueous solution of fine silica particles at 99.8% purity (Aerosil 200, trade name of Nippon Aerosil Co.) as a anti-blocking agent and, thereafter, the tape was wound around a paper core.

Respective two specimens cut out from the thus prepared tape product were overlapped one over the other and the opposing self-adhesive layers were put to pressure-sensitive adhesion (overlapped length in the longitudinal direction; 10 mm). While securing the free end of one specimen, tension was applied along the longitudinal direction of the tape from the free end of the other specimen. The bond strength between the adhesive layers against the horizontal peeling, that is, the horizontal peeling resistance was about 6.0 kg/cm in average for the specimens from three lots of the tape products.

Then, similar respective two specimens were put to pressure-sensitive adhesion in the same manner as above, and peeling force was applied to the free end of one specimen in the direction perpendicular to the plane at the overlapped portion to determine 90° peeling resistance. Peeling was resulted at about 240 g/cm of the peeling force as the average value for the specimens from three lots of the tape products.

When the tapes prepared as above were heated and dried at 40° C. and 50° C. respectively for 14 hours, the average horizontal peeling resistance was increased to about 6.2 kg/cm and 5.7 kg/cm respectively, and the 90° peeling resistance was resulted at about 380 g/cm and 250 g/cm respectively between each of the bonded adhesive layers.

PREPARATION EXAMPLE A-2 ... A-5

Aqueous mixtures No. A-2 ... No. A-5 were prepared respectively in the same procedures as in the Preparation Example A-1 while varying the content for each of the ingredients in the aqueous mixture with respect to the weight ratio between the water soluble adhesive and the rubber latex within the range shown in Table I, and packaging tapes having self-adhesive layers coated on both surfaces of the tape substrate were prepared respectively by using these aqueous mixtures.

Respective specimens obtained from the tapes showed satisfactory value with respect to the horizontal peeling resistance and 90° peeling resistance as shown in Table II.

Further, each of the specimens showed no adhesion at all to typewritten paper sheets and printed matters on the surface of the sheets.

COMPARATIVE EXAMPLES A-5, A-7

An aqueous mixture No. A-6 was prepared by increasing the content of the natural rubber latex in the aqueous mixture No. A-1 of the Preparation Example A-1 to 41.6 parts by weight (24.95% solid content) and aqueous mixture No. A-7 was prepared by decreasing the above-mentioned content to 19.9 parts by weight (11.94% solid content) respectively. Packaging tapes were prepared from them in the same procedures as in the Preparation Example A-1 and the peeling resistance values thereof were measured in the same manner as above.

In the specimen prepared from the aqueous mixture No. A-6 in which the weight ratio of the water soluble adhesive to the rubber latex was decreased out of the range in this invention, the adhesive layer was easily peeled off from the surface of the cellophane substrate upon applying the peeling force, failing to obtain definite measured values, because of the decrease in the amount of the water soluble adhesive.

While on the other hand, in the specimen prepared from the aqueous mixture No. A-7 in which the weight ratio of the water soluble adhesive and the rubber latex was increased out of the range in this invention, the horizontal peeling resistance between the adhesive layers was reduced to about 1.1 kg/cm in average, failing to obtain practically sufficient bond strength (refer to Table II).

For confirming the occurrence of blocking to the tape product, the tape prepared by coating and drying the aqueous mixture No. A-1 was left as it was after winding around a paper core without applying predetermined anti-blocking treatment on the surface of the tape. The adjacent adhesive layers in the tape caused blocking to fuse each other and the adhesive layer was stripped off together with the moisture-proof layer from the surface of the tape substrate when the tape was delivered.

PREPARATION EXAMPLE B-1

100 parts by weight of an aqueous emulsion mainly comprising a vinyl acetate copolymer resin as the water soluble adhesive (56% solid concentration) (Bond SP 235, trade mark of Konishi Co.) were mixed with 50 parts by weight of water and 4 parts by weight of an aqueous 28% ammonia solution, to which were further mixed 140 parts by weight of natural rubber latex (60% solid concentration) and 12 part by weight of Nopcowet (44% solid concentration) to prepare an aqueous mixture for forming the self-adhesive layer (aqueous mixture No. B-1) (adhesive/rubber latex ratio=1:0.67).

The aqueous mixture No. B-1 was coated and dried in the same manner as in the Preparation Example A-1 on both surfaces of a moisture-proof cellophane tape (MST #400) of 20μ in thickness and 18 mm in width, and anti-blocking treatment was further applied using an aqueous 3% Aerosil solution to prepare a both face adhesion type cellophane tape.

PREPARATION EXAMPLES B-2, B-3: COMPARATIVE EXAMPLES B-4, B-5

Cellophane tapes were prepared by using aqueous mixtures No. B-2 and No. B-3 obtained by varying the content of the rubber latex in the aqueous mixture No. B-1 to 95 and 50 parts by weight respectively within the range of this invention, as well as the aqueous mixtures No. B-4 and No. B-5 obtained by varying the content of the rubber latex to 200 and 40 parts by weight respectively out of the range in this invention. The cellophane tapes thus prepared were respectively subjected to the peeling test and the peeling resistance values thereof are shown in Table III.

As apparent from Table III, all of the moisture proof cellophane tapes prepared by coating the aqueous mixtures No. B-2 and No. B-3 had satisfactory peeling resistance against both in the horizontal peeling and the 90° peeling, whereas none of them showed appreciable adhesion to other materials.

On the contrary, the moisture-proof cellophane tapes prepared from the aqueous mixtures No. B-4 and No. B-5 in which the ratio of the water soluble vinyl acetate copolymer adhesive to the rubber latex was out of the range in this invention were not suitable to the practical use in that the bond strength of the adhesive layer to the cellophane substrate was insufficient, as well as in that they lacked in sufficient horizontal peeling resistance.

PREPARATION EXAMPLE C-1

100 parts by weight of water soluble adhesive mainly comprising polyvinyl alcohol (25% concentration, Denkapoval G-05, trade mark of Denki Kagaku Kogyo Co.) were mixed with 50 parts by weight of water and 5 parts by weight of an aqueous 28% ammonia solution, to which 40 parts by weight of rubber latex (60% solid content) were further mixed to prepare an aqueous mixture for forming the self-adhesive layer (aqueous mixture No. C-1) (adhesive/rubber latex weight ratio=0.64/1).

The aqueous mixture No. C-1 was coated and dried on both surfaces of a cellophane tape (MST #400) of 20μ thickness and 18 mm width not applied with moisture-proofing treatment in the same manner as in the Preparation Example A-1 and anti-blocking treatment was further applied by using an aqueous 3% Aerosil solution to prepare cellophane tapes having adhesive layers coated on both surfaces.

When respective specimens cut out from the tapes were subjected to the same test as in the Preparation Example A-1, they showed the horizontal peeling resistance of about 3.8 kg/cm in average and resulted in peeling at about 280 g against the 90° peeling.

PREPARATION EXAMPLES C-2, C-3: COMPARATIVE EXAMPLES C-4, C-5

Aqueous mixtures No. C-2 and No. C-3 were prepared by varying the content of the rubber latex in the aqueous mixture No. C-1 to 50 and 35 parts by weight respectively within the range of this invention, while aqueous mixtures No. C-4 and No. C-5 were prepared by varying the content of the rubber latex in the aqueous mixture to 60 and 10 parts by weight respectively out of the range in this invention for the comparison. Cellophane tapes prepared from these aqueous mixtures in the same procedures as described above had the bond strength against the peeling as shown respectively in Table IV.

As apparent from Table IV, all of the cellophane tapes prepared by coating the aqueous mixtures No. C-2 and No. C-3 showed excellent bond strength against the horizontal peeling and the 90° peeling, whereas none of them showed appreciable adhesion to other materials.

On the contrary, the cellophane tapes prepared from the aqueous mixtures No. C-4 and No. C-5, in which the weight ratio between the water soluble adhesive and the rubber latex was out of the range of this invention were not suited to the practical use in that the adhesive layer lacked in bond strength to the cellophane substrate, as well as in that they lacked in sufficient self-adhesiveness between the adhesive layers was insufficient against the horizontal peeling.

TABLE I

| Component (parts, wt) | A-1 | A-2 | A-3 | A-4 | A-5 | A-6 | A-7 |
| --- | --- | --- | --- | --- | --- | --- | --- |
| Water soluble adhesive | 41.3 (18.90) | 41.0 (18.85) | 40.6 (18.68) | 33.0 (15.18) | 46.2 (21.26) | 26.0 (11.96) | 49.4 (22.72) |
| Rubber latex | 33.1 (19.85) | 32.8 (19.68) | 32.5 (19.50) | 37.1 (22.25) | 20.85 (12.52) | 41.6 (24.95) | 19.9 (11.94) |
| Wetting agent | 3.3 (1.45) | 4.0 (1.75) | 4.9 (2.16) | 4.5 (1.98) | 4.0 (1.76) | 4.2 (1.85) | 3.9 (1.72) |
| 28% ammonia | 1.7 | 1.7 | 1.7 | 1.7 | 2.0 | 2.1 | 2.0 |
| Water | 20.6 | 20.5 | 20.3 | 23.7 | 26.93 | 27.0 | 24.8 |
| Adhesive/latex | 0.95 | 0.94 | 0.92 | 0.68 | 1.70 | 0.48 | 1.90 |

Water soluble adhesive: Mowinyl DM772 (46% solid content)
Rubber latex: Natural rubber latex (60% solid content)
Wetting agent: Nopcowet-50 (44% solid content)

TABLE II (coating film thickness; 6μ)

| Bonding strength (kg/10 mm) | A-1 | A-2 | A-3 | A-4 | A-5 | A-6 | A-7 |
|---|---|---|---|---|---|---|---|
| Horizontal | | | | | | | |
| as prepared | 5.8–6.1 | 4.3–4.4 | 4.2–5.9 | 5.9–6.1 | — | 3.4–3.6 | 0.8–1.5 |
| heated at 40° C. for 14 hr | 6.1–6.4 | 4.4–5.0 | 5.9–6.3 | 6.0–6.3 | — | 3.5–3.8 | 1.0–1.1 |
| 90° direction | | | | | | | |
| as prepared | 140 g–330 g | 200 g–340 g | 80 g–160 g | 350 g–360 g | peeling from the surface of the tape substrate | 110 g–150 g | 40 g–80 g |
| heated at 40° C. for 14 hr | 340 g–400 g | 190 g–350 g | 180 g–250 g | 330 g–400 g | | 130 g–180 g | 120 g–390 g |

TABLE III (coating film thickness: 6μ)

| Bonding strength (kg/10 mm) | B-1 | B-2 | B-3 | B-4 | B-5 |
|---|---|---|---|---|---|
| Horizontal | | | | | |
| as prepared | 3.6–4.0 | 3.5–3.9 | 3.0–3.4 | — | 1.2–1.5 |
| heated at 40° C. for 14 hr | 3.8–4.2 | 3.6–4.0 | 3.2–3.5 | — | — |
| 90° direction | | | | | |
| as prepared | 300 g | 290 g | 280 g | peeling from the surface of the tape substrate | 240 g |
| heated at 40° C. for 14 hr | 320 g | 280 g | 270 g | | — |

TABLE IV (coating film thickness: 6μ)

| Bonding strength (kg/10 mm) | C-1 | C-2 | C-3 | C-4 | C-5 |
|---|---|---|---|---|---|
| Horizontal | | | | | |
| as prepared | 3.6–4.0 | 3.4–3.8 | 3.8–4.2 | 4.0–4.4 | 1.2–1.5 |
| heated at 40° C. for 14 hr | 3.8–4.0 | 3.5–3.6 | 3.9–4.1 | 4.1–4.3 | 1.6–1.9 |
| 90° direction | | | | | |
| as prepared | 280 g | 290 g | 270 g | peeling from the surface of the tape substrate | 180 g |
| heated at 40° C. for 14 hr | 290 g | 290 g | 280 g | | 160 g |

BRIEF DESCRIPTION OF THE ACCOMPANYING DRAWINGS

The specific constitution of the packaging tape according to this invention and the manner of using the packaging tape for various applications will now be described by way of its preferred embodiment referring to the accompanying drawings wherein:

FIG. 1 is a perspective view for a preferred embodiment of a packaging tape according to this invention, FIG. 2 is a cross sectional view of the tape taken along line III—III in FIG. 1, and FIG. 3 is an explanatory view for illustrating the manner of sealing an article using the packaging tape according to this invention.

DESCRIPTION OF PREFERRED EMBODIMENT

Figure 1:
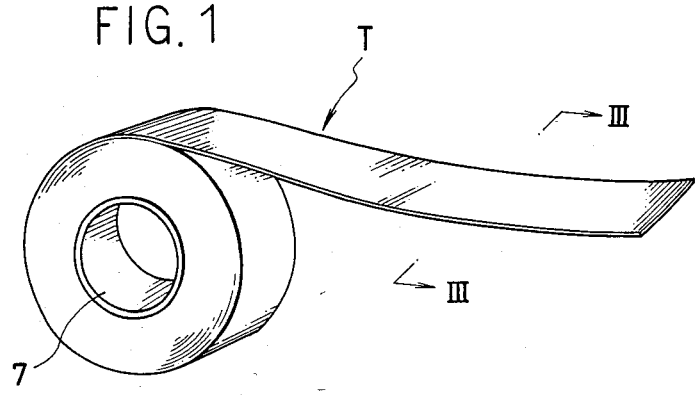
Figure 2:
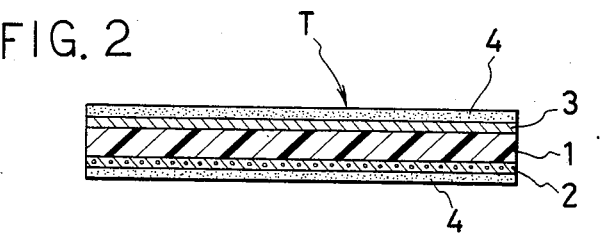

FIG. 1 shows one embodiment of a packaging tape according to this invention wound around a paper core and the tape has a layered structure as shown in FIG. 2.

In the drawing, particularly in FIG. 2, the packaging tape T comprises a tape substrate 1, a colored ink layer 2 disposed on the rear face of the substrate 1, a transparent ink layer 3 disposed on the surface of the substrate 1 and self-adhesive layers 4, 4 disposed on the ink layers 2, 3 respectively.

The tape substrate 1 comprises a plastic film made of biaxially oriented polypropylene (OPP). The both surfaces of the polypropylene film 1 are previously treated under the exposure to plasma or corona discharge before coating the ink layers 2, 3 for improving the adhesion to the ink material.

The colored ink layer 2 on the rear face of the tape substrate 1 is prepared from a two-pack reaction type polyurethane ink composition for use in gravure printing. The transparent ink layer 3 on the surface of the substrate 1 is prepared from the same polyurethane ink composition as that for the colored ink layer 2 but lacking in the pigment.

The colored ink layer 2 and the transparent ink layer 3 are coated on the rear face and the surface of the polypropylene tape substrate 1 respectively using a gravure printing machine.

The polypropylene tape substrate 1 having the ink layers 2, 3 coated thereon was heated to dry in a heating furnace at a temperature of about 40° C. for about 24 hours to further promote the curing reaction between the two components in each of the ink compositions to obtain the ink layers 2, 3 which are extremely tough and in intimate bonding with the surface of the tape substrate 1.

The self-adhesive layer 4 is prepared from an aqueous mixture by mixing 18 parts by weight of aqueous copolymer resin emulsion mainly comprising methylmethacrylate and butylacrylate as the water soluble adhesive ingredient (46% solid concentration) and 23 parts by weight of EVA emulsion in which 20% by weight is copolymerized vinyl acetate (solid concentration 55%) with 20 parts by weight of water and 2 parts by weight of aqueous 28% ammonia solution, to which were further added 34 parts by weight of natural rubber latex (60% solid concentration) as the rubber latex ingredients and 3 parts by weight of a wetting agent mainly comprising sulfosuccinic acid ester (44% solid concentration) to prepare an aqueous mixture (adhesive/rubber latex weight ratio: about 1.12) for forming the self-adhesive layer 4. An anti-aging stabilizer for preventing the oxidation of the rubber latex is further added in an appropriate amount for maintaining the adhesive performance of the rubber latex over a long period of time.

Then, the aqueous mixture thus prepared is uniformly coated over the ink layers 2, 3 coated on the both surfaces of the tape substrate 1 while transferring the substrate 1 at a predetermined speed, and then dried to obtain self-adhesive layers 4, 4 each of about 5μ thickness.

The packaging tape T thus prepared is wound around a paper core 7 and then cut together with the core into several blocks each having 18 mm tape with as shown in FIG. 1.

The bond strength between the self-adhesive layers 4, 4 of the thus prepared packaging tape T is measured for respective two specimens cut out from the tape product. When the respective specimens are put to pressure-sensitive adhesion over an overlapped length of 10 mm (for tape width 18 mm), they show about 6.0 kg horizontal peeling resistance and about 280 g of 90° peeling resistance respectively in average.

The packaging tape T is used for sealing, bundling or packaging various articles as shown below.

Figure 3:
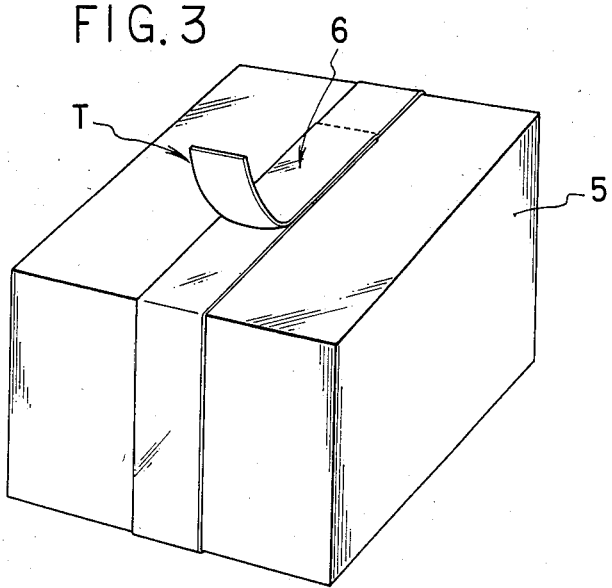

At first, the packaging tape T is used for sealing the opening of a corrugated case 5 as illustrated in FIG. 3, in which the packaging tape T derived from the paper core 7 is wound around the corrugated case 5 along the opening thereof (not shown) under slight tension while being overlapped to each other at an area 6. By slightly pressing the overlapped area 6, the opposing adhesive layers 4, 4 are put to pressure-sensitive adhesion to each other, by which the tight sealing for the corrugated case 5 is completed.

Since the self-adhesive layers 4, 4 provide a horizontal peeling resistance of about 6.0 kg/cm, the tight sealing for the corrugated case 5 can surely be maintained as by the ordinary adhesive tapes with no slacks.

Then, upon opening the corrugated case 5, the packaging tape T is released from its winding end in the direction opposite to that in the initial sealing as shown in FIG. 3. Since the self-adhesive layers 4, 4 bonded to each other show much less 90° peeling resistance as low as about 280 g, it can be detached easily from each other. Further, since the adhesive layer 4 does not stick to the surface of the corrugated case 5, there is no worry that the surface of the case 5 is peeled off or contaminated upon releasing the tape T.

In addition, since the ink colored layer 2 is coated on the rear face of the polypropylene substrate 1, the ink color can be observed through the transparent substrate 1, the transparent ink layer 2 and the self-adhesive layer 4 on the upper surface.

In the packaging tape T of this embodiment, the self-adhesive layers 4, 4 are firmly bonded to the ink layers 2, 3, which are strongly secured to the substrate 1. Therefore, the self-adhesive layers 4, 4 can be anchored well to the substrate 1 with no requirement of anchor or primer coat. Further, upon releasing the self-adhesive layers 4, 4 at the overlapped area 6, there is no worry that the adhesive layer 4 should be peeled off from its substrate by being sticked to the mating adhesive layer 4. Then, no anti-blocking treatment is necessary for the tape of this embodiment.

As described above, the packaging tape T has a unique feature that it does not stick at all to other materials. Accordingly, the tape can be used suitably to the bundling or sealing of articles where peeling damages on the surface thereof should be avoided as much as possible.

For instance, in the case of bundling raw vegetables by using ordinary adhesive tapes, the adhesive performance is somewhat weakened so as to avoid the strong adhesion of the tapes to the vegetables. However, this reduces the necessary bundling effect itself and yet the damages cause to the vegetables can not still be prevented completely upon peeling off the adhesive tapes. In addition, if the surface of the vegetables are wetted excessively, as being the usual case, the adhesion power of the tapes is often invalidated.

In the case of using the packaging tape T according to this invention, a satisfactory bundling effect can be obtained by the self-adhesion between the overlapped tapes and the tapes can be removed quite smoothly without damaging the surface of the vegetables at all.

Further, since the bundling effect for the vegetables is obtained by the tightening force applied upon bundling and the effect is maintained by the bond strength between the overlapped tapes in the packaging tape T of a present embodiment, the bundling effect does not depend on the wet condition on the surface of the vegetables at all.

As described above, the releasable tape according to this invention has a unique and novel feature that it can provide a sufficient tightening effect for packaging, sealing or bundling articles as comparable with that of the ordinary adhesive tapes and yet can be released easily and smoothly without damaging the surface of these articles. Accordingly, the packaging tape of this invention can be used in various other applications, for example, temporal bundling of paper products such as documents, bunchers, calenders or the likes, as well as textile products such as cloths.

What is claimed is:

1. A packaging tape for use in packaging or bundling that sticks to intself but not to the packaged or bundled article, said packaging tape comprising a tape-like substrate having two surfaces and a self-adhesive layer formed on both of the surfaces of said substrate, said self-adhesive layer prepared from an aqueous mixture comprising a water soluble adhesive as an anchoring ingredient to said tape-like substrate, and a rubber latex as a self-adhesive ingredient, which ingredients are mixed with each other in a weight ratio of said water-soluble adhesive to rubber latex within the range between 0.48 and 1.80, whereby said self-adhesive layers firmly bond to each other at an overlapped area between mated layers when the tape is wound around an article to be packaged or bundled, thereby preventing the mated tape layers from unwinding and separating from each other, said self-adhesive layers being non-tacky to the surface of the article in contact with said self-adhesive layers thereby enabling said layers to be freely removed from the surface of the article packaged or bundled upon unwinding the tape.

2. The packaging tape as defined in claim 1, wherein the tape-like substrate comprises a plastic film.

3. The packaging tape as defined in claim 1, wherein the tape-like substrate comprises a polypropylene film.

4. The packaging tape as defined in claim 1, wherein the tape-like substrate comprises a moisture proof cellophane film.

5. The packaging tape as defined in claim 1, wherein the water soluble adhesive comprises emulsion adhesive containing material selected from the group consisting of acrylate, vinyl acetate, ethylene vinyl acetate and a mixture thereof.

6. The packaging tape as defined in claim 1, wherein the rubber latex is natural rubber latex.

7. The packaging tape as defined in claim 1, wherein the rubber latex is synthetic rubber latex.

8. The packaging tape as defined in claim 1, wherein an anti-blocking treatment is applied to the surface of the self-adhesive layer.

9. The packaging tape as defined in claim 1, wherein the self-adhesive tape is subjected to heat treatment at a temperature between about 40°–50° C.

10. The packaging tape as defined in claim 1, wherein an ink layer is disposed at least on one surface of the tape-like substrate, the ink being a dried composition comprising a vehicle having a suitable bond strength to said substrate and the self-adhesive layer, and said self-adhesive layer is formed on said ink layer.

11. The packaging tape as defined in claim 10, wherein a second ink layer is disposed on the opposite surface of the tape-like substrate and the first ink layer disposed between the substrate and the self-adhesive layer contains a colored pigment while the second ink layer is transparent and contains no pigment.

12. The packaging tape as defined in claim 10, wherein the first ink layer comprises an urethane resin type ink composition.

* * * * *